Dec. 18, 1962
J. O'HARA-WRIGHT
3,068,744
PRODUCTION OF AN ANIMATED DISPLAY
Filed April 27, 1959
4 Sheets-Sheet 1
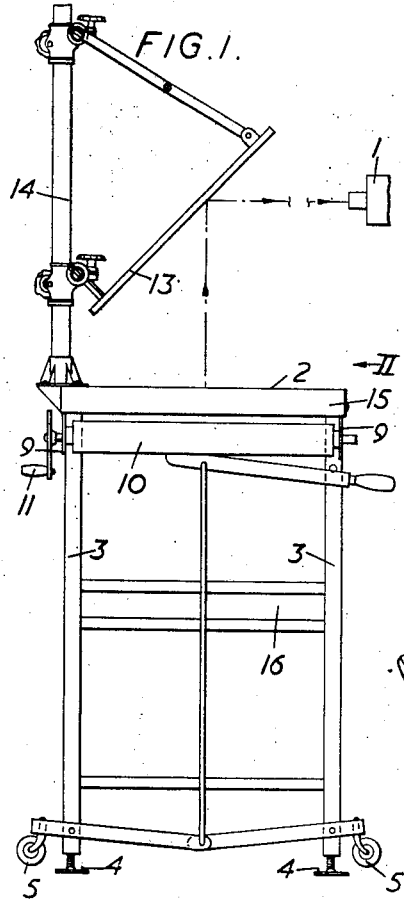
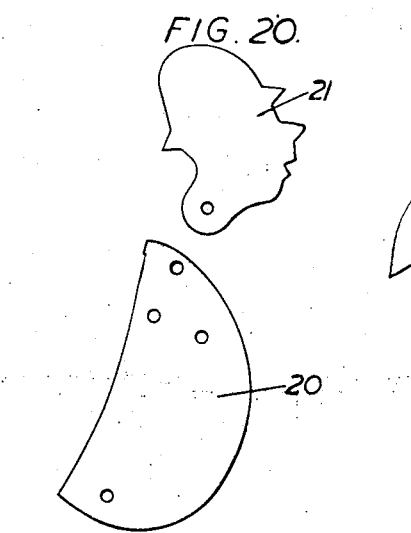
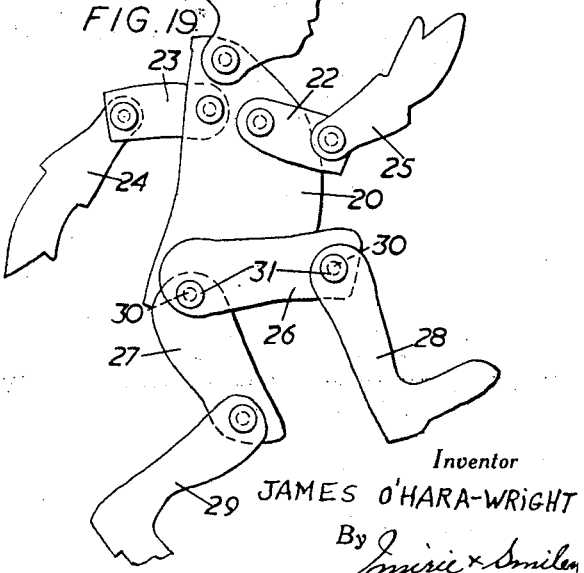
Inventor
JAMES O'HARA-WRIGHT
By
Imirie & Smiley
Attorneys

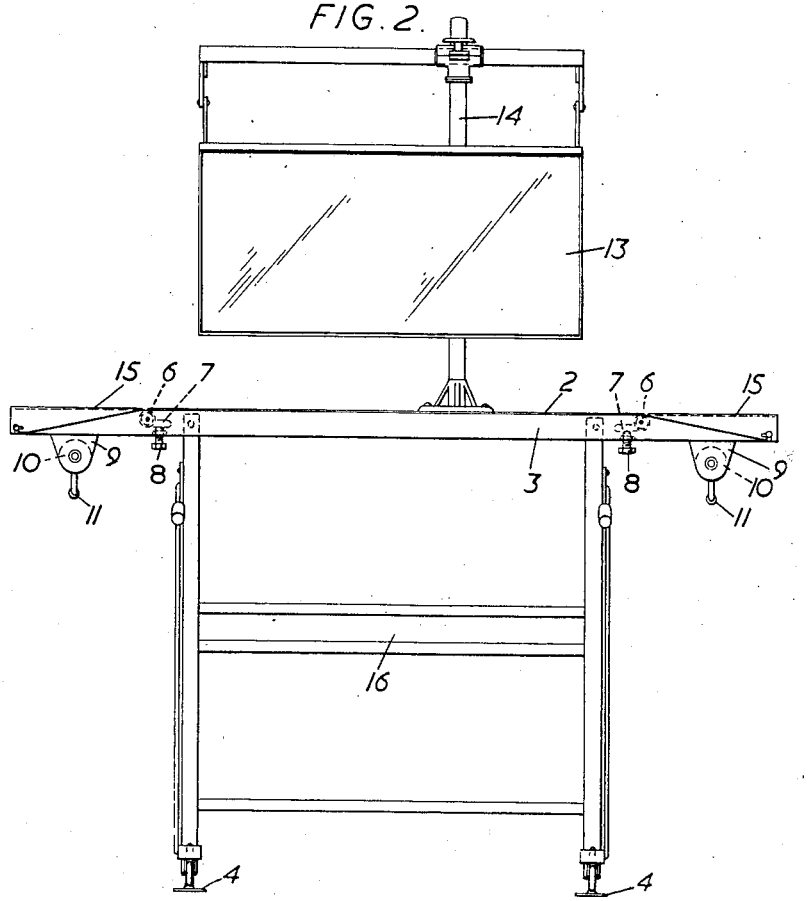

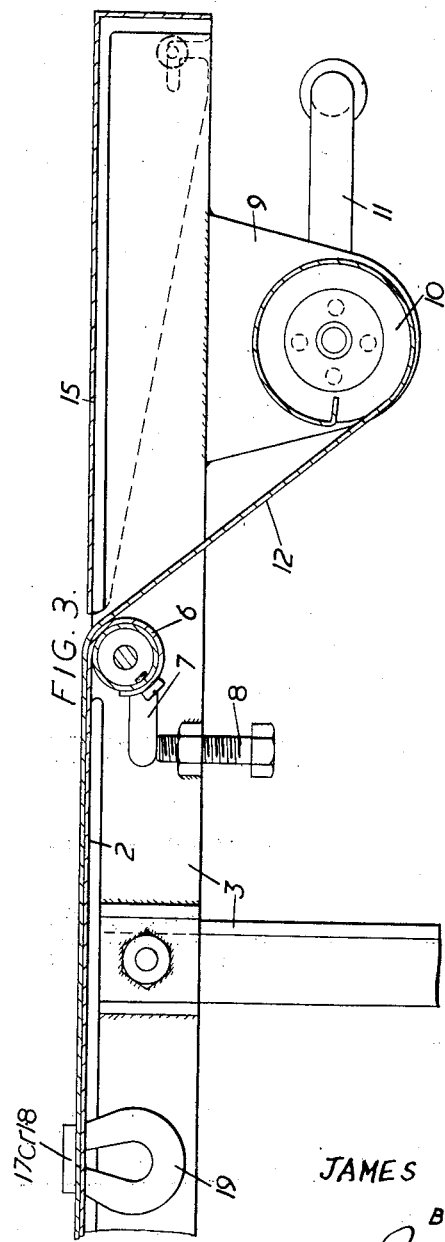

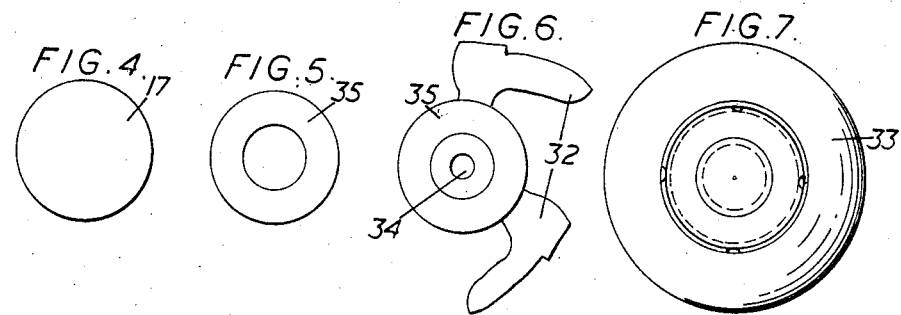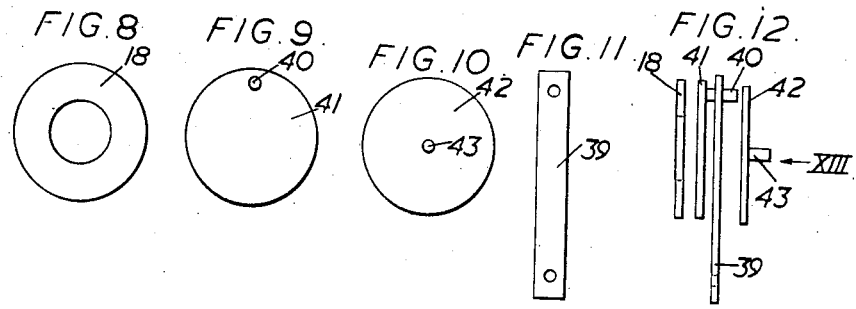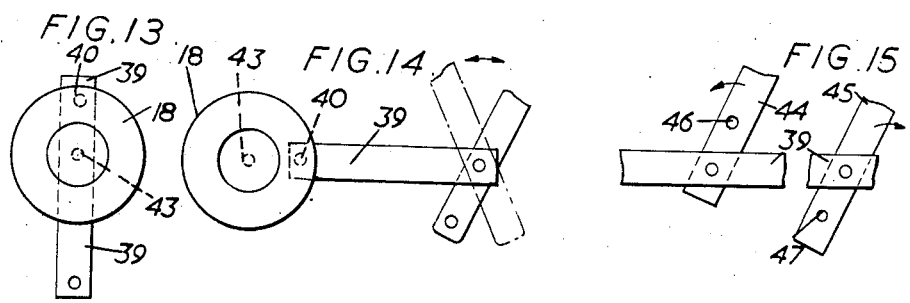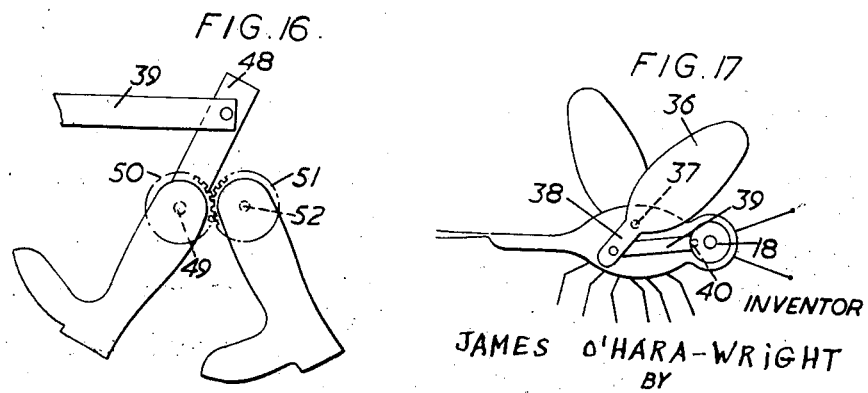

United States Patent Office 3,068,744
Patented Dec. 18, 1962

3,068,744
PRODUCTION OF AN ANIMATED DISPLAY
James O'Hara-Wright, 12 Gordon Road,
Chiswick, London W. 4, England
Filed Apr. 27, 1959, Ser. No. 809,185
8 Claims. (Cl. 88—16)

This invention relates to an improved apparatus for producing an animated display, particularly for the purpose of being viewed by television cameras and transmitted in the known manner.

It is a main object of the present invention to provide an apparatus for producing by the use of inanimate objects a continuously animated display which can be viewed by television cameras and directly transmitted thereby instead of, as has been usual heretofore, being first produced as a cinema film for transmission by the television cameras.

As is well understood, the art of cinema film animation has long been practised in the film industry by the process which entails the use of a cinema camera, stop motion or single frame exposures of individually hand drawn pictures, a length of film, and film processing equipment which permits a positive to be produced from a negative for projection. The television camera however, being an electronic device, does not use sensitized film.

The television camera only sees motion continuously and in the creation of animation in an inanimate object for viewing by the television camera is thus rendered difficult. In attempts to solve this problem many arrangements have been proposed whereby models, marionettes, or puppets, glove or otherwise, are moved in actually in view of the television camera. It has also been proposed to use cut-out models in combination with drawings and to effect operation of the models by the use of cords, wires, levers, rods or handles which are concealed from the vision of the television camera.

The present invention provides a simple and relatively cheap manner of producing an animated display of inanimate objects for viewing by a television camera while concealing the means of animation and avoiding the use of the manipulating expedients mentioned above.

In order that the invention may be clearly understood one embodiment thereof will now be described, by way of example, with reference to the accompanying diagrammatic drawings, in which:

FIGURE 1 is an end elevation of a part of the apparatus,

FIGURE 2 is an elevation looking in the direction of arrow II, FIGURE 1,

FIGURE 3 shows, partly in section and to an enlarged scale, a part of the apparatus illustrated in FIGURE 2, FIGURES 4 and 5 respectively illustrate a magnetically attractable disc and a washer, FIGURE 6 illustrates a pair of boots assembled with the disc and washer of FIGURES 4 and 5, FIGURE 7 illustrates a wheel assembled with the disc and washer of FIGURES 4 and 5, FIGURES 8, 9 and 10 respectively illustrate a magnetically attractable washer, a disc with a crank pin, and a disc with a coaxial pin, FIGURE 11 illustrates a crank arm, FIGURE 12 is an exploded view of the elements shown in FIGURES 8 to 11 in an operative relationship thereof, FIGURE 13 is a view looking in the direction of arrow XIII, FIGURE 12, FIGURE 14 is a view illustrating the mode of operation of the device of FIGURE 13, FIGURE 15 illustrates a modification to the arrangement of FIGURE 14, FIGURE 16 illustrates a means of effecting simultaneous movement of two connected parts in opposite sense, FIGURE 17 illustrates a model of a flying insect fitted with a device of the kind illustrated in FIGURE 14, FIGURE 18 illustrates the face side of an inanimate object which may be employed and shows the side of the object which is viewed by the camera, FIGURE 19 illustrates the reverse side of FIGURE 18, and FIGURE 20 illustrates the reverse sides of two of the ten parts which comprise the object shown in FIGURES 18 and 19.

Referring to the drawings, the display on which the television camera 1, FIGURE 1, is to be focused is disposed on a thin non-magnetisable support 2 which in one embodiment of the invention consists of a thin sheet of aluminum. If desired, the support may be transparent or translucent and it may be made of a plastics material. The support 2 is carried by a frame 3 the legs of which are provided with adjustable feet 4. Wheels or castors 5 may be provided to facilitate movement of the apparatus from one place to another and preferably are arranged to be movable into and out of engagement with the floor so that the frame may rest on feet 4 during the production of a display.

The opposite ends of the support 2 are anchored to anchor elements 6, FIGURES 2 and 3, pivoted in frame 3 and an arm 7 extends from each element 6 and is engaged by an adjustable screw 8. Adjustment of screws 8 permits the tension in support 2 to be adjusted.

Bearing elements 9 which extend from frame 3 support rollers 10 for rotation in either direction by means of handles 11. Each roller 10 has a slit formed therein to receive, as indicated in FIGURE 3, an end of a flexible background element 12, FIGURE 3. The element 12, which may be made of paper and bear a background scene, extends across the upper surface of the support 2. It will be understood that by rotating the handles 11 the element 12 can be moved lengthwise in either direction.

To avoid the necessity of disposing the camera 1 above the support 2 a mirror 13, FIGURES 1 and 2, is carried by a pillar 14 secured to frame 3 and the mirror is adapted to be adjustable lengthwise of the pillar, to be adjustable towards and away from the pillar and to be rotatable about the pillar.

Stripper members 15 are attached to frame 3 at positions adjacent to the opposite ends of support 2 and, as can be seen from FIGURE 3, are spaced from the support to permit the element 12 to pass between the ends of the support and the stripper members. The stripper members are adapted to receive objects from element 12 after they have been moved by element 12 out of the range of view of the camera.

A tray or drawer 16 is carried by the frame 3 and is adapted to receive objects for disposition on the element 12 by the manipulator of the display.

Control means are provided to magnetically adhere inanimate objects, such for example as are illustrated in FIGURE 17 and FIGURES 18 to 20, to the element 12 while in view of the camera. As illustrated in the drawings the control means comprises a magnetically attractable member, such as the disc 17, FIGURE 4, or the washer 18, FIGURE 8, and a permanent magnet 19, FIGURE 3, In the preferred embodiment of the invention the member 17 or 18 is carried by the inanimate object and the magnet 19 is disposable for selective manual manipulation in close relation with the side of the support 2 opposite that over which the element 12 is movable, see FIGURE 3. It is to be understood, however, that if desired the locations of the attractable member and magnet can be reversed. Further, if desired the magnet may be replaced by a solenoid or other means adapted to create a magnetic field.

In FIGURES 18 and 19, there is illustrated an object having ten relatively movable parts consisting of a body 20, head 21, upper arms 22, 23, fore arms 24, 25, thighs 26, 27, and fore legs 28, 29. Each of these parts is pivotally connected one to another by small pins 30 having their axes substantially at right angles to the flat sides of the object. The pins are held in position at the rear of the object discs 31 secured to the object. An attractable member is connected to each of the parts which it may be required to move during the production of a display, for example an attractable member may be fitted to the rear of the head 21 to control movement thereof relative to the body 20 and a further member fitted to the rear of the body to control movement of the object as a whole relative to the support 2.

If it is desired to effect movement of rotary parts of an object, for example of a pair of feet 32, FIGURE 6, or a wheel 33, FIGURE 7, the object part is provided with a pivot pin 34 which is mounted in the rear of the object. In these circumstances the attractable member which is secured to the object is not a flat disc 17 as shown in FIG. 4 but is a washer 35, similar to washer 18, which surrounds the pivot pin 34.

On the other hand, if the object part is to be rockable, as in the case of the wing 36 of the winged insect, FIGURE 17, the pivot pin 37 for the object part is connected to an arm 38 which is connected to one end of a crank arm 39, FIGURE 11, the other end of which is connected to a crank pin 40 on a crank disc 41, FIGURE 9, the crank disc being sandwiched between the attractable washer 18 and a bearing disc 42, FIGURE 10, having a pin 43 by which the disc 42 is connected to the object. Animation of the winged insect, FIG. 17, is effected by laying the insect on a background element 12, FIG. 3, and by manipulating a magnet 19 disposed in close relation with the side of the support 2 opposite that over which the element 12 is movable. By appropriate manipulation of the magnet 19 member 18 is rotated and through the crank arm 39 and arm 38 the wing 36 is rocked about the axis of the pivot pin 37.

FIGURE 15 illustrates the manner in which crank arm 39 can rock two arms 44, 45 simultaneously in opposite directions about the axes of pivot pins 46, 47.

FIGURE 16 illustrates an alternative manner in which two object parts can be rocked simultaneously in opposite sense, this being effected by the crank arm 39 rocking an arm 48 about the pivot 49 of an object part having a gear wheel 50 secured thereto and co-axial with its pivot. The gear wheel 50 meshes permanently with a second gear wheel 51 which is secured to the second of the two parts of the object and which is co-axial with the pivot 52 therefor.

All of the objects are made of thin material, for example of cardboard or of a plastics material, so that even when an object consists of a number of parts, as illustrated in FIGURES 18 and 19, the object as a whole is a flat object.

When producing a display the operator lays the desired object face side uppermost on the upper surface of the background element 12 and can produce the illusion of related movement between the object and the element 12 by rotating a handle 11 to effect lengthwise movement of the element 12. During this time the object is magnetically adhered to the element 12 by a magnet 19 and an attractable member which is carried by the object, it being understood that the strength of the magnetic field is so chosen as to permit the element 12 to slide between support 2 and the object.

Alternatively to, or in addition to, the movement effected as just described, the object may be moved bodily relative to the support 2 by varying the position of the magnet 19.

Rotary movement of the parts of the object can be effected by varying the position of the lines of force of the magnetic field as by rotating the magnet 19 beneath the support and the rate of movement may be varied by simultaneously moving the magnet angularly in planes which intersect the plane of the support 2.

From the foregoing it will be understood that by manipulation, out of sight of the camera, of the background element 12 and of one or more magnets 19 there can be easily and cheaply produced a continuous animated display of the two dimensional animated cartoon type which can be televised without the necessity of first producing a cinema film.

Although the apparatus above described are primarily for use in producing a continuous display for direct viewing by a television camera it will be understood that in many instances the new technique can be used to produce cinema films more cheaply than they could be produced by the known technique for producing animated cartoons or the like by the separate drawing method, and by using a cinema camera animated cartoons may be produced by continuous or single frame exposures made at the will of the operator. Further, video-tape electronic recording may be made by linking an electronic camera of the television type in circuit with a tape-recording apparatus and directing the camera on to an animated display produced by the method herein described, thus permitting the speedy production of video-tape recordings of the animated cartoon type.

I claim:

1. Apparatus for producing an animated display, comprising a thin non-magnetisable support carried by a frame, a background element movable lengthwise over one side of the support, means to effect lengthwise movements of the background element, a flat inanimate object adapted to lie on one side of the background element, said object having at least two pivotally connected relatively movable parts and carrying a magnetically attractable control member, and control means adapted to create a magnetic field and disposable in close relation with the side of the support opposite the side thereof over which the background element is movable for selective movement in any direction with respect to the background element to co-operate with said control member to effect movement of the object as a whole or articulated movement of a part thereof relative to the background element.

2. Apparatus according to claim 1, wherein said control member carried by the object is supported by the object to be rotatable about an axis substantially at right-angles to the flat sides of the object.

3. Apparatus according to claim 1, wherein said control member has a part of the object secured thereto for rotation therewith.

4. Apparatus according to claim 1, wherein said control member is provided with a crank pin connected to a crank arm which in turn is connected to a pivoted part of the object whereby rotation of the said control member will effect rocking of the object part about the pivotal axis therefor.

5. Apparatus according to claim 4, wherein the object is provided with two pivoted parts connected by gear wheels co-axial with the pivots and the crank arm is connected with one of the pivoted parts so that rocking thereof causes the other of the two pivoted parts to be rocked in opposite sense.

6. Apparatus according to claim 1, wherein the support comprises a thin sheet of aluminum the opposite ends of which are secured to anchor elements rockable in said frame, and tensioning means co-operating with the anchor elements to permit tension in the sheet to be adjusted.

7. Apparatus according to claim 1, wherein stripper members attached to the frame at positions adjacent to the opposite ends of the support are spaced from the support to permit the background element to pass between the ends of the support and the stripper members and are adapted to receive objects from the background element as it passes between the support and a stripper member.

8. Apparatus according to claim 1 wherein is additionally provided a mirror carried by the frame for adjustment relative to the support about three mutually perpendicular axes and operable to portray the display provided by the background element and said object for viewing by a camera.

References Cited in the file of this patent

UNITED STATES PATENTS

| | | |
|---|---|---|
| 2,260,092 | Pickley | Oct. 21, 1941 |
| 2,930,296 | Simjian | Mar. 29, 1960 |

FOREIGN PATENTS

| | | |
|---|---|---|
| 569,665 | Germany | Feb. 6, 1933 |
| 1,118,122 | France | May 31, 1956 |